United States Patent
Seki

(10) Patent No.: US 8,452,284 B2
(45) Date of Patent: May 28, 2013

(54) BASE STATION APPARATUS, MOBILE COMMUNICATION SYSTEM AND CELL SELECTION COMMUNICATION METHOD

(75) Inventor: Hiroyuki Seki, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 333 days.

(21) Appl. No.: 12/499,405

(22) Filed: Jul. 8, 2009

(65) Prior Publication Data
US 2009/0270101 A1 Oct. 29, 2009

Related U.S. Application Data

(63) Continuation of application No. PCT/JP2007/052191, filed on Feb. 8, 2007.

(51) Int. Cl.
*H04M 1/00* (2006.01)
*H04W 40/00* (2009.01)
*H04B 7/00* (2006.01)

(52) U.S. Cl.
USPC ............ 455/435.2; 455/562.1; 455/446; 455/524

(58) Field of Classification Search
USPC ............ 455/7, 11.1, 15, 16, 63.1, 67.13, 455/69, 114.2, 226.2, 226.3, 436, 437, 438, 455/439, 440, 442, 443, 444, 446, 447, 448, 455/449, 450, 452.2, 502, 503, 522, 524, 455/525, 526; 370/328, 329, 330, 336, 341
See application file for complete search history.

(56) References Cited

U.S. PATENT DOCUMENTS

| | | | |
|---|---|---|---|
| 6,577,880 B1 | 6/2003 | Ishida et al. | |
| 7,304,967 B2* | 12/2007 | Kakura | 455/450 |
| 7,406,295 B1* | 7/2008 | Yarkosky | 455/9 |
| 7,751,778 B1* | 7/2010 | Ngan | 455/414.1 |
| 2007/0049324 A1* | 3/2007 | Sambhwani et al. | 455/525 |
| 2010/0075683 A1* | 3/2010 | Johansson et al. | 455/446 |

FOREIGN PATENT DOCUMENTS

| | | |
|---|---|---|
| JP | 1-300634 | 12/1989 |
| JP | 10-163937 | 6/1998 |
| JP | 2001-036949 | 2/2001 |
| JP | 2002-261665 | 9/2002 |
| JP | 2003-078937 | 3/2003 |
| JP | 2005-006124 | 1/2005 |

OTHER PUBLICATIONS

English Translation of International Preliminary Report on Patentability for corresponding International Application No. PCT/JP2007/052191, with a mailing dated of Aug. 20, 2009.

(Continued)

*Primary Examiner* — Kent Chang
*Assistant Examiner* — Nelson Rosario
(74) *Attorney, Agent, or Firm* — Myers Wolin, LLC

(57) ABSTRACT

Provided are a base station apparatus and a cell selection communication method which suppresses wasteful consumption of wireless resources. The base station apparatus is provided with a basic antenna for forming a first cell, and a switching unit. The switching unit is connected to a boundary antenna, which has an area in the vicinity of a cell boundary between the first cell and a second cell adjacent to the first cell as a propagation area (an area smaller than the second cell) by directivity. The switching unit switches an antenna for transmitting wireless signals (data) to a terminal device in the propagation area of the boundary antenna, between the basic antenna and the boundary antenna.

17 Claims, 12 Drawing Sheets

OTHER PUBLICATIONS

International Search Report with Written Opinion to the International Search Report for Application No. PCT/JP2007/052191, dated Feb. 22, 2007.

A. Morimoto et al.; "Effect of Fast Cell Selection in High Speed Downlink Packet Access"; SB-2-2, General Conference in Institute of Electronics, Information and Communication Engineers 2002 with English Translation; pp. 819-820; Dated Mar. 2002. [Whole Document].

H. Furukawa et al.; "SSDT-Site Selection Diversity Transmission Power Control for CDMA Forward Link"; IEEE Journal on Selected Areas in Communications, vol. 18, No. 8, pp. 1546-1554; Dated Aug. 2000 [Whole Document].

Notice of Reason for Rejection issued for corresponding Japanese Patent Application No. 2008-556951 mailed Mar. 13, 2012 with English translation.

* cited by examiner

BASE STATION APPARATUS, MOBILE COMMUNICATION SYSTEM AND CELL SELECTION COMMUNICATION METHOD

CROSS-REFERENCE TO RELATED APPLICATIONS

This is a continuation of Application PCT/JP2007/052191, filed on Feb. 8, 2007, now pending, the contents of which are herein wholly incorporated by reference.

FIELD

The present invention relates a cellular mobile communications in which a base station apparatus forms a cell or a sector and allocates a wireless resource to a user within the cell or the sector by scheduling.

BACKGROUND

The recent cellular mobile communication involves using frequency allocation based on [one cell frequency reuse] which utilizes the same frequency band in all of the cells or the sectors in order to improve frequency available efficiency. In this case, at a cell boundary or a sector boundary, an SIR (Signal to Interference power Ratio) of the signal declines due to influence exerted by the same frequency interference from the neighboring cells or the neighboring sectors, resulting in such a problem that a communication throughput decreases.

A fast cell selection (Fast Cell Selection) method is under consideration as a method of improving the communication throughput at the cell boundary on a downlink to a mobile station from a base station (refer to Non-Patent document 1 given below).

The fast cell selection method is proposed for the first time as SSDT (Site Selection Diversity Transmission) (refer to Non-Patent document 2 given below). Note that a similar technology implemented between the sectors might be called fast sector selection, however, these are the same in terms of their principles. Accordingly, unless particularly specified, the cell can be construed as the sector in a way that gives a different reading, while the sector can be construed as the cell in the way of changing the wording.

FIG. 11 is a diagram representing the principle of the fast cell selection method. In the fast cell selection method, a mobile station MS1 existing in the vicinity of the cell boundary measures a propagation state of each cell and notifies the base station of the cell offering the optimal propagation state. Data, which should be transmitted to the mobile station MS1, is transmitted from only the base station in the plurality of base stations that forms the cell offering the optimal propagation state of which the mobile station notifies. A scheme of the fast cell selection method is not that the same information is transmitted simultaneously from the plurality of cells as by soft handover but that the cell exhibiting a good propagation state is invariably selected and used for the transmission. The fast cell selection method fast follows an alteration of propagation state by switching over the base station which transmits the data at high frequency on a slot basis illustrated in FIG. 11.

A base station control unit having a function of linking up operations between the base stations is employed for switching over the transmission slot at the high speed between the base stations. As in the case of the fast sector selection method, if a distance between the base stations (between the antennas) is short, the two base stations and the base station control unit in FIG. 11 can be actualized within one single apparatus. Thus, also in the case of the actualization within one single apparatus, respective function units realized by the base stations and the base station control unit in FIG. 11 need providing within the single apparatus. Accordingly, the same principle is applied to the fast sector selection method in such a case that the single base station configures a plurality of sectors.

[Non-Patent document 1] Morimoto, Abeta and Sawahashi, "Effect of Fast Cell Selection in Downlink Fast Packet Transmission", SB-2-2, General Meeting of the Institute of Electronics, Information and Communication Engineers, March in 2002.

[Non-Patent document 2] H. Furukawa, K. Hamabe and A. Ushirokawa, "SSDT—Site Selection Diversity Transmission Power Control for CDMA Forward Link," IEEE Journal on selected areas in communications, Vol. 18, No. 8, pp. 1546-1554, August in 2000.

SUMMARY

When executing the fast cell selection conducted on such an occasion that the mobile station MS1 exists in a boundary area, however, though the mobile station MS1 does not use the wireless resources of both of the cell 1 and the cell 2 simultaneously in terms of time, the transmission to the mobile station MS1 is conducted at a certain point of timing in the cell 1, and the transmission to the mobile station MS1 is carried out at a different point of timing in the cell 2, with the result that the wireless resources are reserved for one mobile station MS1 over a range of totalizing the cell 1 and the cell 2.

FIG. 12 is a diagram representing transmission slot allocation in a case where the mobile station exists in a position away from the cell boundary. This can be understood from a comparison between FIG. 11 and FIG. 12.

It is an object of the present invention to provide a base station apparatus and a cell selection communication method, which suppress wasteful consumption of wireless resources.

The present invention adopts the following configurations in order to solve the problems given above. Namely, a base station apparatus in a first mode of the present invention comprises: a basic antenna forming a first cell; and a switching unit connected to a boundary antenna covering a propagation area (narrower than an area of a second cell) with directivity in the vicinity of a cell boundary between the first cell and the second cell neighboring to the first cell, and switching an antenna for transmitting radio signals (data) to a terminal device existing within the first cell and existing in the propagation area of the boundary antenna, between the basic antenna and the boundary antenna.

It should be noted that the wireless resources can be shared in terms of time in the cell 1 and in the propagation area of the boundary antenna.

Herein, the first cell and the second cell may also be sectors respectively. The present invention does not limit an option of a cell configuration or a sector configuration.

Thus, in the base station apparatus according to the first mode of the present invention, the antenna used for transmitting the data to the terminal device is switched over. Accordingly, the area used by the terminal device before and after the switching is confined to the sector 1 and the propagation area in the vicinity of the cell boundary, and it follows that influence on the sector 2 is restrained locally.

With this contrivance, for example, the wireless resources utilized by the terminal device in a time-sharing manner in the sector 1 and in the boundary area can be also utilized within the sector 2.

Preferably, the wireless resources can be reused in a region except for the boundary area within the sector 2.

Further, the base station apparatus according to the first mode of the present invention may further comprise control unit controlling the switching unit so as to transmit the data to the terminal device via the basic antenna or the boundary antenna, which offers a better propagation state for the terminal device existing in the propagation area of the boundary antenna.

Still further, the base station apparatus according to the first mode of the present invention may further comprise a scheduler making, if the boundary antenna is used for the switching control, allocation so as to use the wireless resource utilized before or after the switching control when transmitting transmission data via the basic antenna forming the second cell to a terminal device suffering interference, smaller than a predetermined value, from signals transmitted via the boundary antenna in the terminal devices connecting with the second cell.

Yet further, the base station apparatus according to the first mode of the present invention may further comprise orthogonalizing unit orthogonalizing, when at least one terminal device exists in each of the first cell and the second cell as well as existing within the propagation area of the boundary antenna, the transmission data for the terminal device existing in the first cell and the transmission data for the terminal device existing in the second cell to each other.

With this configuration, it is feasible to use further efficiently the wireless resources of the first cell and the second cell and to actualize highly-acceptable communications with the terminal device existing in the vicinity of the cell boundary. By extension, according to the present invention, a communication throughput can be improved. Moreover, such an effect can be obtained with the configuration that is as simple as the switching unit described above.

Moreover, the base station apparatus according to the first mode of the present invention may further comprise determining unit determining, based on control information transmitted from the terminal device, identifying information for specifying the terminal device existing in the propagation area of the boundary antenna and a transmission allocation priority level for the terminal device, wherein the control unit may instruct, when obtaining a permission for using the boundary antenna that is determined based on the identifying information and the transmission allocation priority level, the switching unit to execute the switching control by use of the boundary antenna.

According to this configuration, on the occasion of actualizing the switching control between the basic antenna and the boundary antenna, the basic antenna undergoing the switching control from-and-to the boundary antenna is determined based on the identifying information and the transmission allocation priority level.

Hence, it is possible to prevent the apparatus configuration from getting complicated.

Furthermore, a second mode of the present invention is related to a mobile communication system including the plurality of base station apparatuses described above and further a boundary antenna apparatus including the boundary antenna described above.

In the second mode of the present invention, the boundary antenna apparatus may further comprise orthogonalizing unit orthogonalizing, when at least one terminal device exists within the propagation area of the boundary antenna and exists in each of the cells between which the cell boundary is formed within the propagation area, the transmission data for the terminal device existing in each of the cells to each other.

Moreover, the boundary antenna apparatus may further comprise multiplexing unit multiplexing a pilot signal distinguishable from a pilot signal to be transmitted from the basic antenna of each of the base station apparatuses with a signal to be transmitted from the boundary antenna.

Furthermore, the mobile communication system according to the second mode of the present invention may further comprise a control station apparatus including: collecting unit collecting the identifying information for specifying the terminal device existing in the propagation area of the boundary antenna and the transmission allocation priority level for the terminal device from the base station apparatus which is scheduled to use the antenna and forms each of the cells embraced by the propagation area of the boundary antenna; antenna allocating unit determining the base station apparatus enabled to utilize the boundary antenna for the switching control on the basis of the identifying information and the transmission allocation priority level, which are collected by the collecting unit; and transmitting unit transmitting information on the base station apparatus determined by the antenna allocating unit to the base station scheduled to use the antenna.

Still furthermore, a third mode of the present invention is related to a terminal device which comprises: first estimating unit estimating a first propagation state from a basic antenna on the basis of a pilot signal transmitted from the basic antenna forming a first cell; second estimating unit estimating a second propagation state from a boundary antenna on the basis of a pilot signal transmitted from the boundary antenna covering a propagation area with directivity in the vicinity of a cell boundary between the first cell and a second cell; and determining unit determining, based on the first propagation state and the second propagation state which are thus estimated, application of switching control between the boundary antenna and the basic antenna.

It should be noted that the present invention may also be a cell selection communication method by which the base station apparatus, the mobile communication system or the terminal device realizes any of the function described above. Further, the present invention may also be a program for making the base station apparatus or the terminal device realize any of the functions described above.

According to the present invention, it is feasible to actualize the base station apparatus and the cell selection communication method, which suppress wasteful consumption of wireless resources.

DESCRIPTION OF EMBODIMENTS

A mobile communication system according to a best mode (which will hereinafter be termed an embodiment) for carrying out the present invention will hereinafter be described with reference to the drawings. A configuration in the following embodiment is an exemplification, and the present invention is not limited to the configuration in the embodiment.

Principle of Embodiment of the Invention

Figure 1:
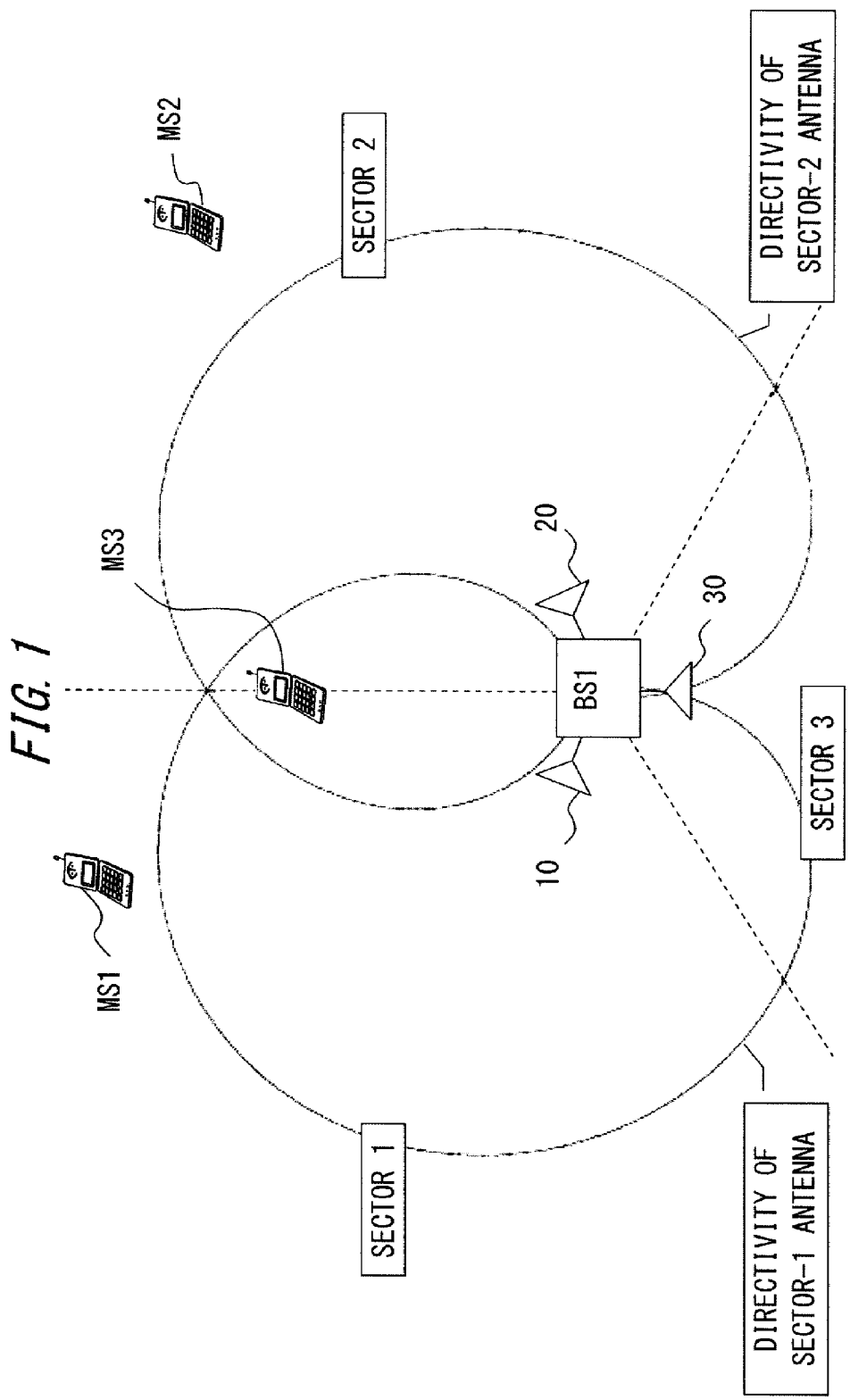
FIG. 1 is a view illustrating directivities of respective antennas in a sector 1 and a sector 2 in a base station apparatus BS1 taking a conventional 3-sector configuration.

An embodiment of the present invention will be described with reference to FIGS. 1 and 2. FIG. 1 is a view illustrating directivities of respective antennas (an illustration of the directivity of an antenna 3 is omitted) of a sector 1 and a sector 2 in a base station apparatus (which will hereinafter be simply also referred to as a base station) BS1 taking a conventional 3-sector configuration. The base station BS1 includes antenna apparatuses (which will hereinafter be simply also referred to as antennas) 10, 20 and 30 forming, e.g., the respective sectors. An example in FIG. 1 is that the antenna 10 forms the sector 1, the antenna 20 forms the sector 2, and the antenna 30 forms the sector 3. It should be noted that the present principle is the same with an example in which the different base stations form the respective sectors as well as with an example in which one single antenna forms each sector.

FIG. 1 represents an example where the sector 1 accommodates a mobile terminal device (which will hereinafter simply be termed a mobile station) MS1, the sector 2 accommodates the mobile station MS2, and the mobile station MS3 exists in the vicinity of a boundary between the sector 1 and the sector 2 while being connected to the sector 1.

Figure 11:
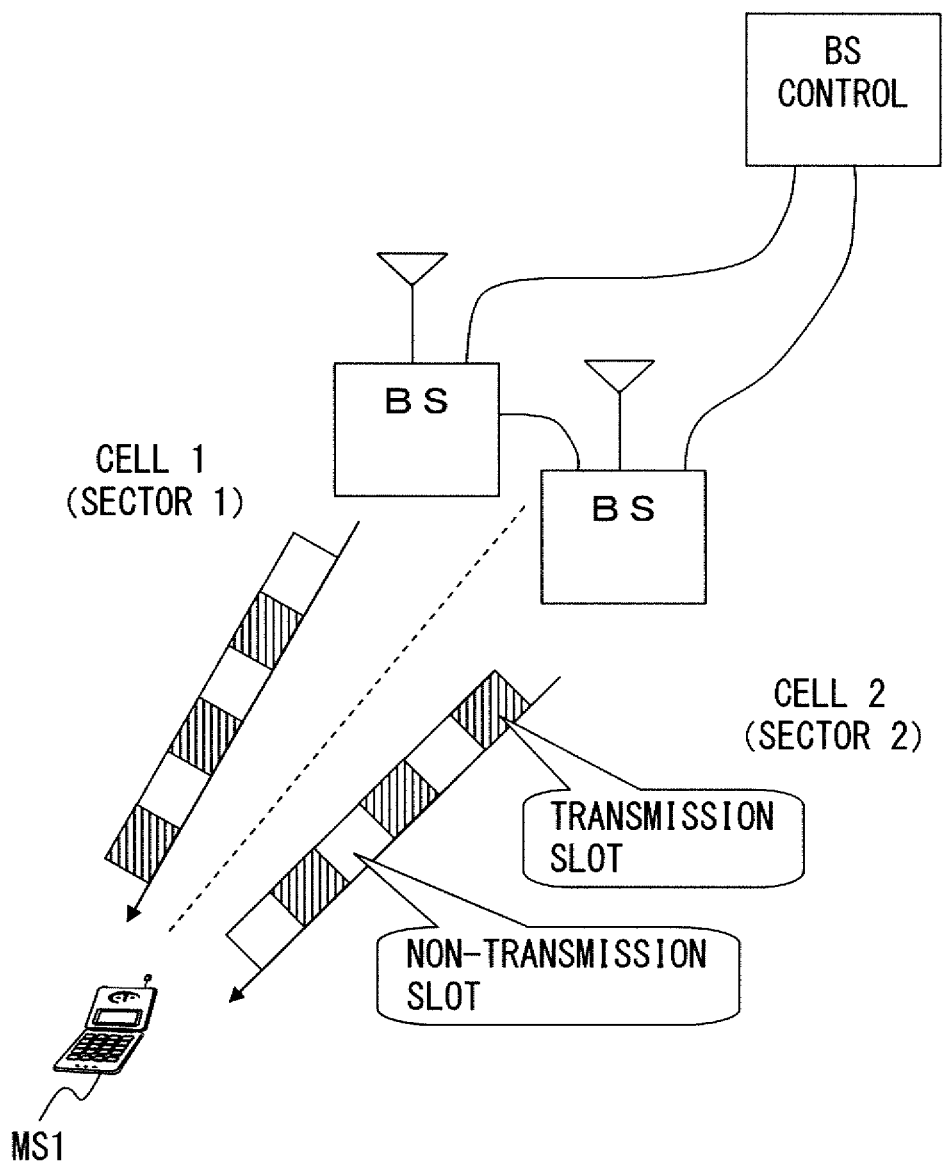
FIG. 11 is a diagram representing the principle of a fast cell selection method.
Figure 12:
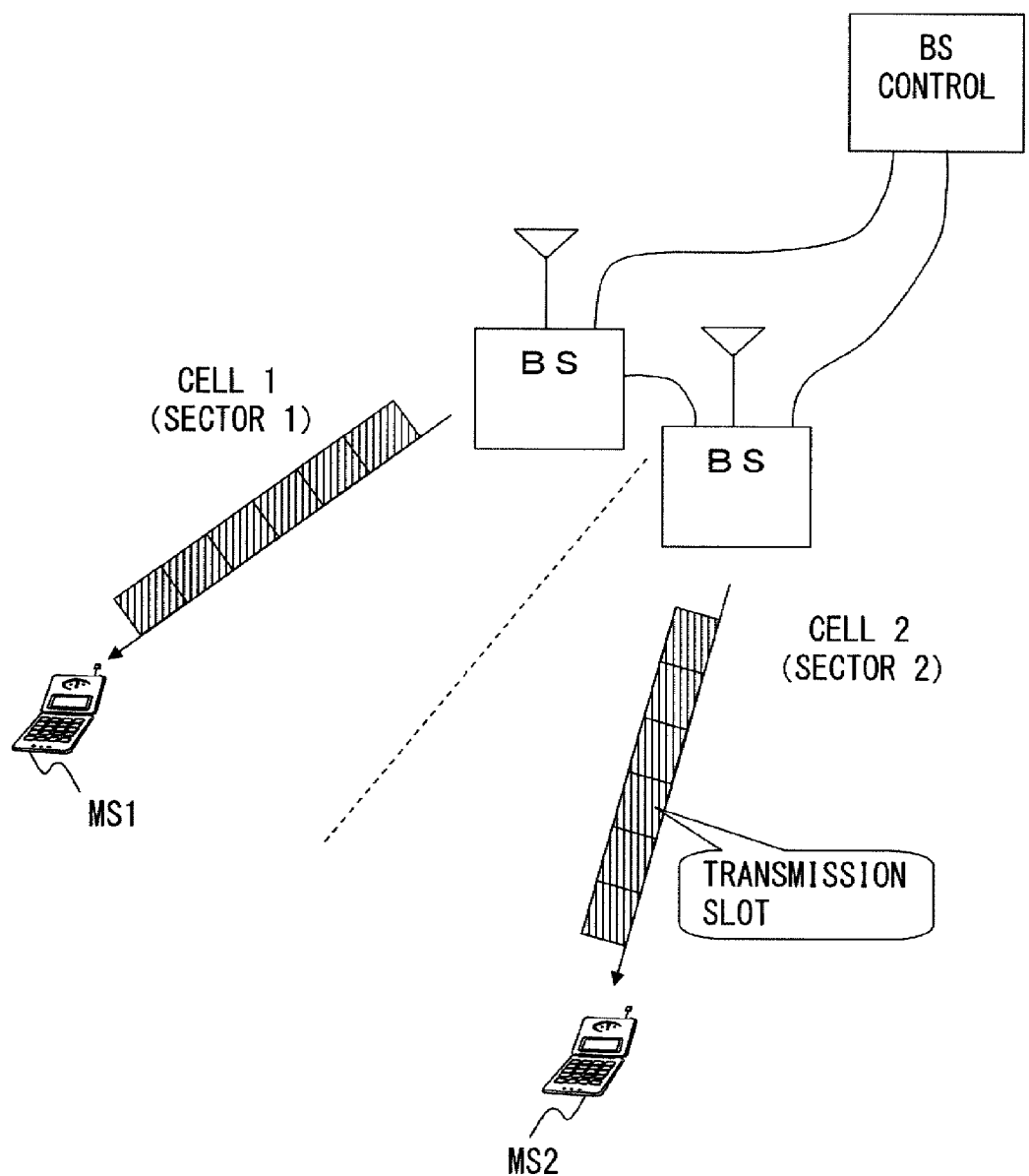
FIG. 12 is a diagram representing transmission slot allocation in a case where the mobile station does not exist at the cell boundary.

At this time, the base station BS1 executes a fast cell (sector) selection between the sector 1 and the sector 2 with respect to the mobile station MS3 which establishes a link with the sector 1. In this case, as illustrated in FIG. 11, a downlink wireless resource of the sector 2 in addition to a downlink wireless resource of the sector 1 is allocated to the mobile station MS3, and therefore the downlink wireless resource of the sector 2, which is allocated to the mobile station MS3, can not be allocated to the mobile station MS2 accommodated by the sector 2. The mobile station MS3 actually, however, utilizes only the allocated wireless resource of one of the two sectors at every transmission timing. Hence, the conventional fast cell selection has a problem that the wireless resource of the base station on one side is not effectively utilized.

Such being the case, the present invention has a scheme of providing a cell or sector boundary dedicated antenna apparatus (which will hereinafter be referred to as a boundary antenna) having such a directivity that a communication area is limited to the vicinity of the boundary between the cells or the sectors, and making the (fast) cell selection between the base station antenna and this boundary antenna.

Incidentally, it is desirable that an area covered by the boundary antenna is narrower than an area covered by the sector 2 (or the boundary antenna covers only a part of the cover area of the sector 2).

Figure 2:
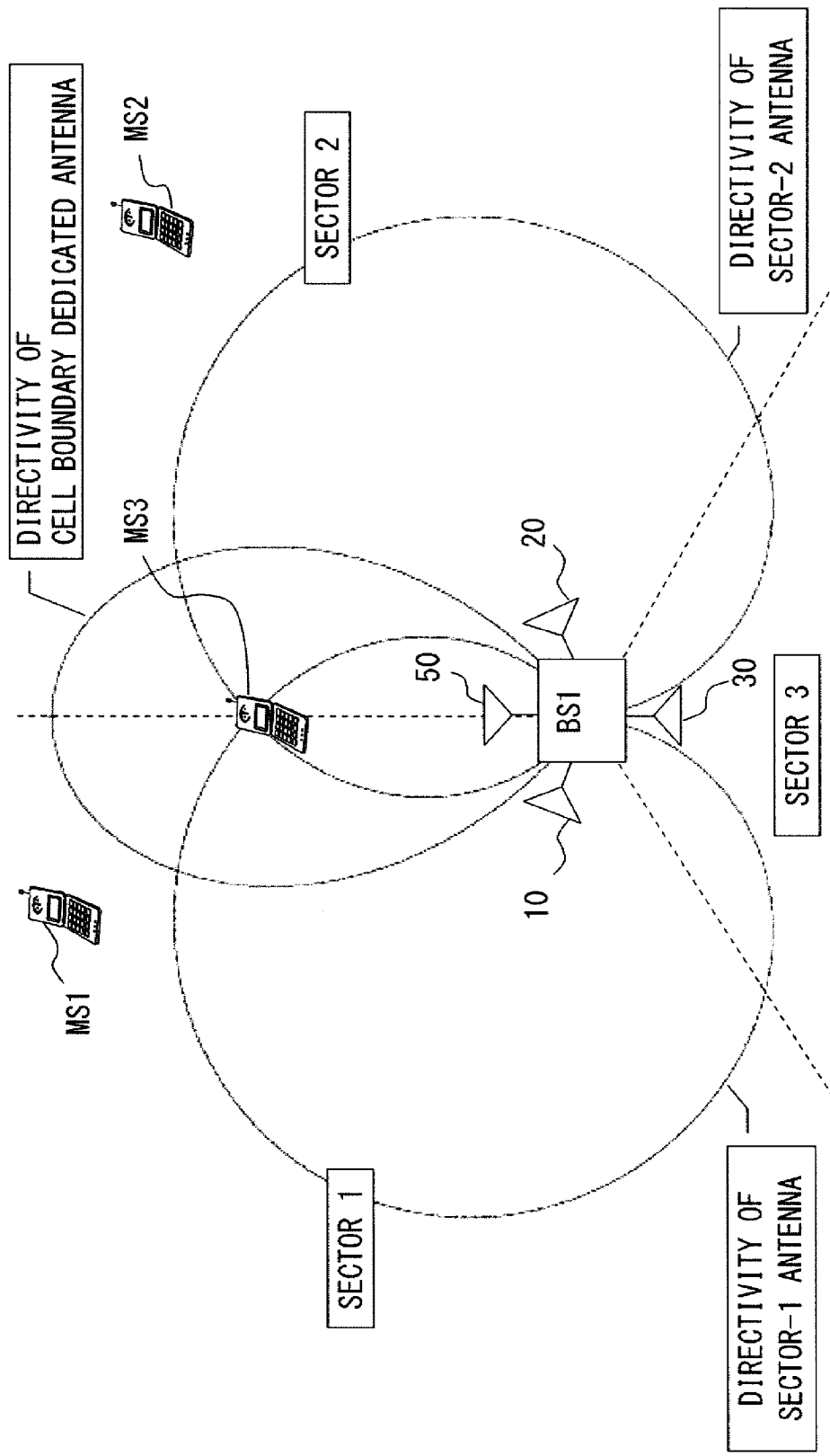
FIG. 2 is a view representing the directivities of the respective antennas in the base station BS1 taking the 3-sector configuration in an embodiment of the present invention.

FIG. 2 is a view representing the directivities of the respective antennas in the base station BS1 taking the 3-sector configuration in the embodiment of the present invention. The base station BS1 includes a boundary antenna 50 in addition to the base station antennas 10, 20 and 30 forming the conventional sectors 1, 2 and 3. The boundary antenna 50 has the directivity which extends long vertically, however, it is desirable that a reachable distance of radio signals to be transmitted is adjusted so as to enable e.g., the illustrated mobile station MS3 to receive the radio signals by controlling transmission power.

If the mobile station MS3 establishing the wireless link with the sector 1 exists in the vicinity of the boundary between the sector 1 and the sector 2, the base station BS1 executes the fast cell selection by use of the base station antenna 10 and the boundary antenna 50. At this time, in the sector 2, the wireless resource can be utilized for the other mobile station MS2 without reserving the wireless resource for the mobile station MS3. For example, let F1 be the wireless resource utilized by the mobile station MS3, the mobile station MS2 uses the F1 within the sector 2.

Preferably, if the mobile station MS2 accommodated in the sector 2 does not exist at the sector boundary, the base station BS1 utilizes the wireless resource (F1) for the mobile station MS2.

Further, the base station BS1, when performing the communications with a plurality of mobile stations within the sector 2 and if the sector 2 makes the fast cell selection, selects a mobile station that does not exist in the vicinity of the sector boundary and can also transmit the radio signals to the selected mobile station by use of the wireless resource (F1) utilized by the mobile station MS3.

Embodiment

A mobile communication system in the embodiment of the present invention will hereinafter be described with reference to the drawings. The paragraph described above has provided the discussion on the principle of the fast cell selection at the sector boundary by exemplifying the case in which the base station BS1 takes the 3-sector configuration, however, the present embodiment, which follows, will provide the discussion on the example in which the plurality of base stations form the individual cells. Note that the principle of the fast cell selection in the mobile communication system in the embodiment is the same as the principle discussed in the section [Principle of Embodiment of the Invention] described above.

System Architecture

Figure 3:
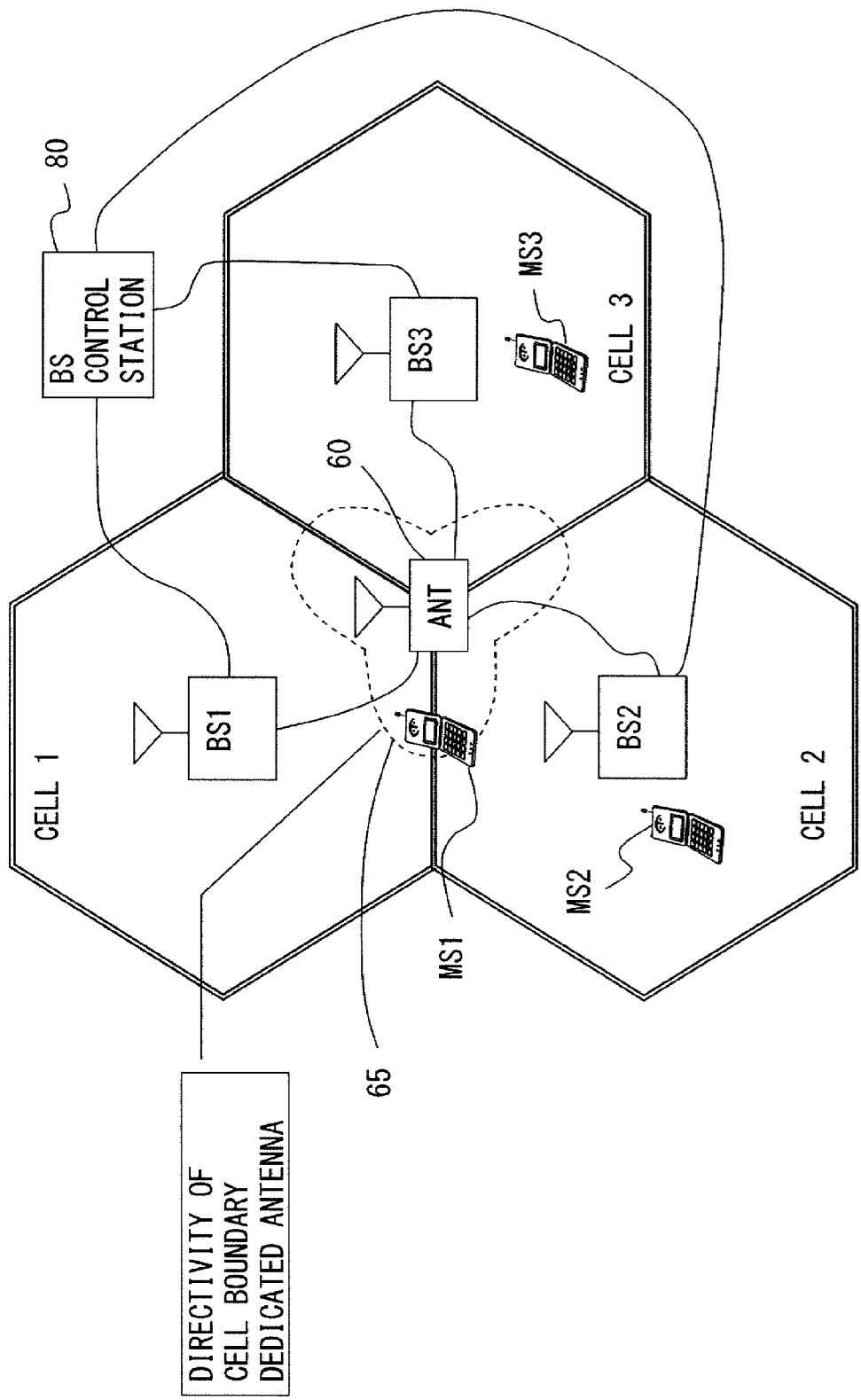
FIG. 3 is a view representing a system architecture and the principle of the mobile communication system in the embodiment.

A system architecture of the mobile communication system in the embodiment will hereinafter be described with reference to FIG. 3. FIG. 3 is a view representing the system architecture and the principle of the mobile communication system in the embodiment. The mobile communication system in the embodiment includes a boundary antenna 60, base stations BS1, BS2 and BS3, a base station control apparatus (which will hereinafter be simply referred to as a control station) 80, etc., which controls these base stations.

The base stations BS1, BS2 and BS3 form a cell 1, a cell 2 and a cell 3 by employing directional antennas etc. The boundary antenna 60 is installed in the vicinity of the boundary among the neighboring cells 1, 2 and 3 and is connected via a high-speed interface such as an optical fiber to the base stations BS1, BS2 and BS3 forming the respective cells.

Further, the base stations BS1, BS2 and BS3 are each connected to the control station 80 via the high-speed interface such as the optical fiber. Through this connection, the base stations BS1, BS2 and BS3 transmit and receive predetermined items of information via the control station 80, thereby managing the boundary antenna 60, collectively. Note that the respective base stations may also manage the boundary antenna 60 by transmitting and receiving the information to and from each other without involving the control station 80.

The mobile communication system in the embodiment performs the wireless communications via the base station antennas of the respective base stations or the boundary antenna 60, thereby providing a predetermined communication service to the plurality of mobile stations MS1, MS2 and MS3 connected to the mobile communication system. In the example of FIG. 3, the mobile station MS2 exists in the cell 2, the mobile station MS3 exists in the cell 3, and the mobile station MS1 exists in a communication area 65 of the boundary antenna 60 as well as existing at the border between the cell 1 and the cell 2. Note that in the following discussion, the base stations BS1, BS2 and BS3 are, in the case of explaining common contents of the base stations BS1, BS2 and BS3, are simply expressed generically as the base station, while the mobile stations are, in the case of describing common contents of the mobile station, are simply expressed generically as the mobile station.

Outline of System Operation

Herein, an operation of the mobile communication system in the embodiment will be outlined with reference to FIG. 3.

The mobile communication system in the embodiment carries out the fast cell selection by employing the boundary antenna 60 installed in the vicinity of the border among the three cells. When the mobile station MS1 connected to the base station BS1 for the cell 1 exists at the cell boundary, the base station BS1 performs the fast cell selection for the mobile station MS1 between the base station antenna and the boundary antenna 60. At this time, in the cell 2 and the cell 3, the radio signals are transmitted to the mobile station MS2 and the mobile station MS3 which do not exist in the vicinity of the cell boundary.

With this scheme, it is feasible to use all of the wireless resources of the three cells and to perform the highly-acceptable communications with the mobile station MS1 existing in the vicinity of the cell boundary. By extension, a cell average throughput can be improved.

For example, the radio signals are transmitted to the mobile station MS1 by use of the wireless resource F1 in a way that switches over the base station antenna of the base station BS1 and the boundary antenna (having the directivity toward the boundary area between the base station BS1 and the base station BS2). Then, the radio signals are transmitted to the mobile station MS2 (MS3) by employing the wireless resource F1 from the base station antenna of the base station BS2 (BS3).

The boundary antenna 60 periodically transmits an independent pilot signal. The mobile station measures a propagation state of the signal transmitted from each antenna by use of the pilot signal transmitted from the boundary antenna 60 and the pilot signal transmitted from the antenna of the base station to which the mobile station is connected. The mobile station notifies the connected base station of propagation environment information as a result of the measurement. The propagation environment information involves utilizing, e.g., CQI (Channel Quality Indicator).

Further, the mobile station transitions to a fast cell selection mode if a measured CQI difference between the cell and the boundary antenna is equal to or smaller than a threshold value. The mobile station, which transitions to the fast cell selection mode, feeds back antenna selection information for informing the base station of the antenna offering a better reception quality and the CQI of this antenna to the base station. The feedback thereof involves utilizing, e.g., an uplink control channel. Taken herein is a scheme of notifying of the CQI of the antenna exhibiting the better reception quality in order to save a quantity of information to be fed back, however, the measured CQIs of all of the antennas may also be fed back.

The base station in the embodiment detects the mobile station in the fast cell selection mode on the basis of the antenna selection information and the CQI that are thus fed back from the mobile station, and executes the fast cell selection by use of the base station antenna and the boundary antenna 60 for the detected mobile station.

Configuration of Apparatus

Respective apparatuses building up the mobile communication system in the embodiment for actualizing the system operation described above, will hereinafter be described with reference to the drawings.

<Base Station Apparatus>

Figure 4:
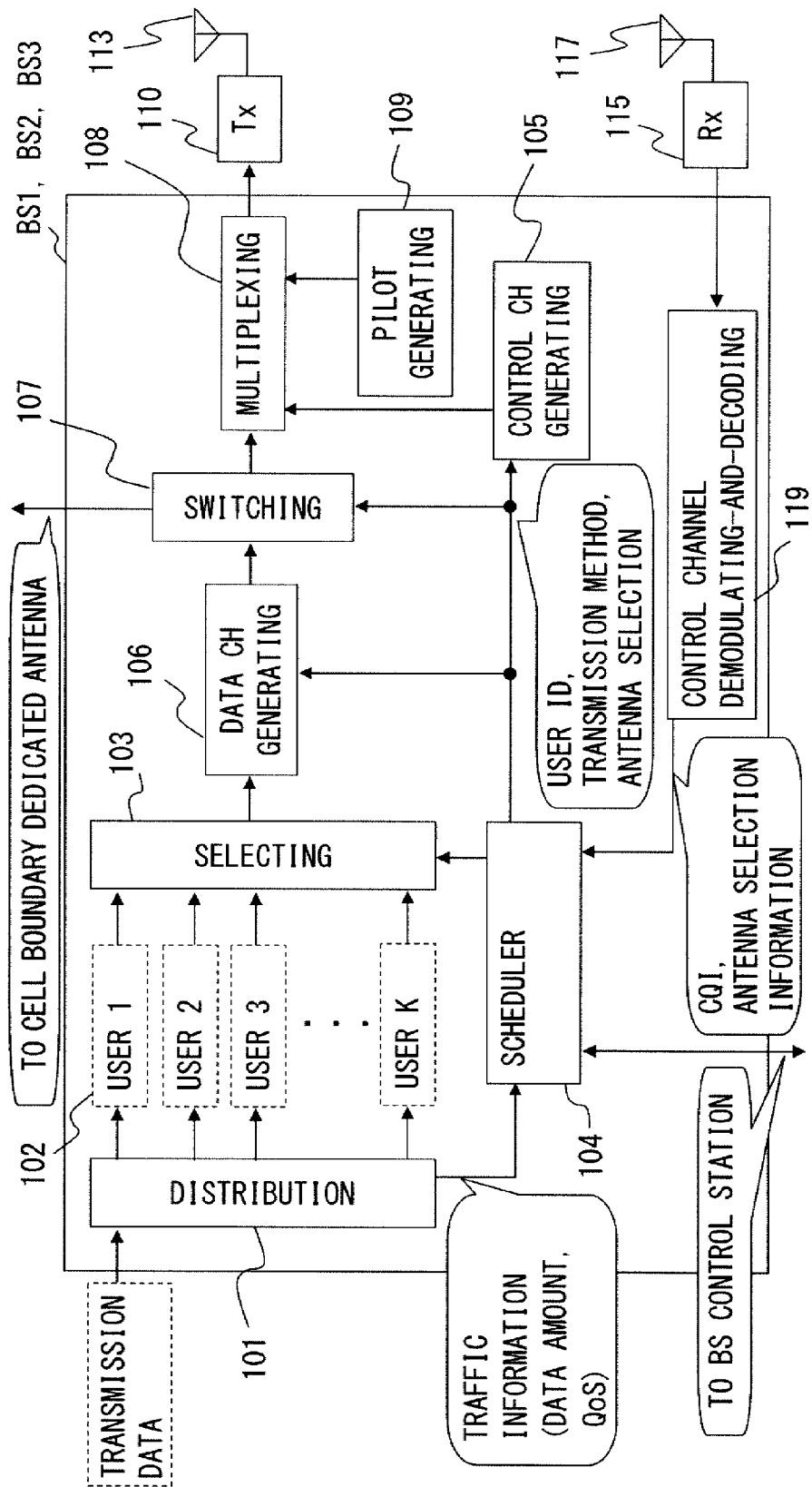
FIG. 4 is a block diagram representing functional configurations of the base stations BS1, BS2 and BS3 in the embodiment.

FIG. 4 is a block diagram representing functional configurations of the base stations BS1, BS2 and BS3 in the embodiment. The present invention relates to a function of the transmission to the mobile station from the base station, and hence FIG. 4 illustrates only the functions related to the present invention. The present invention does not limit functions other than the function units shown in FIG. 4 and may therefore further include other function units. The respective function units of the base station illustrated in FIG. 4 may be realized by hardware circuits and may also be realized in such a way that a control program stored in a memory is loaded and executed by a CPU (Central Processing Unit).

The base station includes, as illustrated in FIG. 4, a distribution unit 101, a buffer 102, a selecting unit 103, a scheduler 104, a control channel generating unit 105, a data channel generating unit 106, a switching unit 107, a multiplexing unit 108, a pilot generating unit 109, a transmitter 110, a transmitting antenna 113, a receiving antenna 117, a receiver 115, a control channel demodulating-and-decoding unit 119, etc. The functions units will hereinafter be described respectively.

The receiver 115 frequency-converts the radio signal, from the mobile station, received by the receiving antenna 117 into baseband signal, and the baseband signal is converted into digital baseband signal by an A/D converter (unillustrated). The digital baseband signal is transmitted to the control channel demodulating-and-decoding unit 119.

The control channel demodulating-and-decoding unit 119 extracts control information by demodulating and decoding the digital baseband signal. The control information contains the antenna selection information determined by the mobile station and the CQI information of the selected antenna. The thus-extracted antenna selection information and CQI information are sent to the scheduler 104.

The distribution unit 101, when transmission data toward a plurality of users (mobile stations) connected to the base station is transmitted from a switching center (unillustrated) etc, distributes the transmission data toward the users on a user-by-user basis, and stores the distributed transmission data in each buffer 102. The distribution unit 101 notifies the scheduler 104 of items of information such as a data size of transmission traffic including the transmission data and a quality request (QoS (Quality of Service)) for each transmission traffic.

The scheduler 104 generates, based on the size of the transmission to each user and the QoS that are sent from the distribution unit 101 and the CQI information of each mobile station that is sent from the control channel demodulating-and-decoding unit 119, scheduling information of the transmission data toward the normal mobile station (user) other than in the fast cell selection mode. A method of generating the scheduling information of the transmission data toward this normal mobile station (user) is the same as the conventional method, and hence its description is omitted.

Moreover, the scheduler 104 detects the mobile station transitioning to the fast cell selection mode on the basis of the antenna selection information of the respective mobile stations, which is sent from the control channel demodulating-and-decoding unit 119. The scheduler 104, when the antenna selection information is transmitted from the mobile station, detects the mobile station, which is a sender of the antenna selection information, as the mobile station in the fast cell selection mode. With respect to the detected mobile station in the fast cell selection mode, the scheduler 104 generates a priority level of transmission allocation of the mobile station in the fast cell selection mode on the basis of the transmission data size to the mobile station and the QoS that are sent from the distribution unit 101 and the CQI information of the mobile station that is sent from the control channel demodulating-and-decoding unit 119. The scheduler 104 sets the priority level high, e.g., when the transmission data exhibits the high QoS and when the CQI from the mobile station as a destination of the transmission data is low, and sets this priority level low when the transmission data exhibits the low QoS and when the CQI from the mobile station as the destination of the transmission data is high. The scheduler 104 notifies the control station 80 of the information specifying the mobile station in the fast cell selection mode and the priority level of the transmission allocation of the mobile station.

The scheduler 104 instructs, based on the scheduling information determined in the way described above, the selecting unit 103 to select the user and the data channel generating unit 106 to generate the data channel.

On the other hand, the scheduler 104, upon receiving the notification, given from the control station 80, of permitting the use of the boundary antenna 60, executes fast cell selection control about the transmission data to the mobile station in the fast cell selection mode. To be specific, the scheduler 104 instructs the selecting unit 103 to select the transmission data to the mobile station in the fast cell selection mode, and instructs the data channel generating unit 106 to transmit or not to transmit the selected transmission data.

Moreover, the scheduler 104, in the case of receiving the use permitting notification of the boundary antenna 60, instructs the switching unit 107 to switch over the antenna on the basis of the antenna selection information and the CQI information of the mobile station, which are sent from the control channel demodulating-and-decoding unit 119. The antenna selection information contains the information representing the antenna, the boundary antenna 60 or the transmitting antenna 113, which offers the better reception quality for the mobile station in the fast cell selection mode.

On the other hand, the scheduler 104, in the case of receiving none of the use permitting notification of the boundary antenna 60 from the control station 80, instructs the data channel generating unit 106 not to transmit the transmission data to the mobile station in the fast cell selection mode. Note that the use permitting notification of the boundary antenna 60 is changed on, e.g., a frame-by-frame basis, and hence the transmission data to the mobile station in the fast cell selection mode comes to a status of waiting till the use permitting notification of the boundary antenna 60 is reached.

The scheduler 104, while receiving none of the use permitting notification of the boundary antenna 60 from the control station 80, determines to allocate the transmission to the mobile station representing small interference from the boundary antenna 60, i.e., the mobile station other than in the fast cell selection mode. At this time, the scheduler 104 may further narrow down the determination about the transmission allocating target mobile station on the basis of the CQIs given from the mobile stations.

The scheduler 104 notifies the control channel generating unit 105 of the user (the user ID) selected based on the determined scheduling information, the transmission method (a modulation method, a spreading code, etc), the antenna selection information and so on.

The selecting unit 103 acquires, from the predetermined buffer 102, the transmission data of the user identified by the selected user ID of which the scheduler 104 notifies, and sequentially sends the thus-acquired transmission data to the data channel generating unit 106.

The data channel generating unit 106 allocates the transmission data sent from the selecting unit 103 to a predetermined data channel in accordance with the instruction given from the scheduler 104, thus generating the data signals. The generated data signals are transmitted to the switching unit 107.

Based on the instruction given from the scheduler 104, the switching unit 107 switches over the antenna, the transmitting antenna 113 or the boundary antenna 60, from which to transmit the data signals for the mobile station in the fast cell selection mode. The switching unit 107 switches over the antenna from which the data signal for the mobile station in the fast cell selection mode is transmitted to the antenna specified by the antenna selection information on a transmission-slot basis.

The control channel generating unit 105 generates a control signal containing the selected user (the user ID), the transmission method (the modulation method, the spreading code, etc), the antenna selection information, etc of which the scheduler 104 notifies. The thus-generated control signal is transmitted to the multiplexing unit 108.

The pilot generating unit 109 generates a pilot signal having a pattern determined by each base station. The generated pilot signal is transmitted to the multiplexing unit 108.

Figure 5:
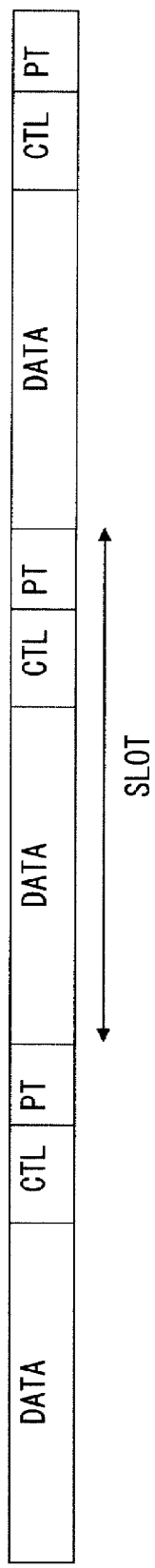
FIG. 5 is a diagram representing an outline of a multiplexed digital baseband signal.

The multiplexing unit 108 multiplexes the data signal transmitted from the switching unit 107, the control signal transmitted from the control channel generating unit 105 and the pilot signal transmitted from the pilot generating unit 109, thereby generating a multiplexed digital baseband signal. FIG. 5 is a diagram representing an outline of the multiplexed digital baseband signal. The multiplexed digital baseband signal is transmitted to the transmitter 110.

In the transmitter 110, a D/A converter (unillustrated) analog-converts the multiplexed digital baseband signal, and the thus-converted baseband signal is frequency-converted, thereby generating the radio signal. The generated radio signal is transmitted from the transmitting antenna 113.

<Cell Boundary Dedicated Antenna Apparatus>

Figure 6:
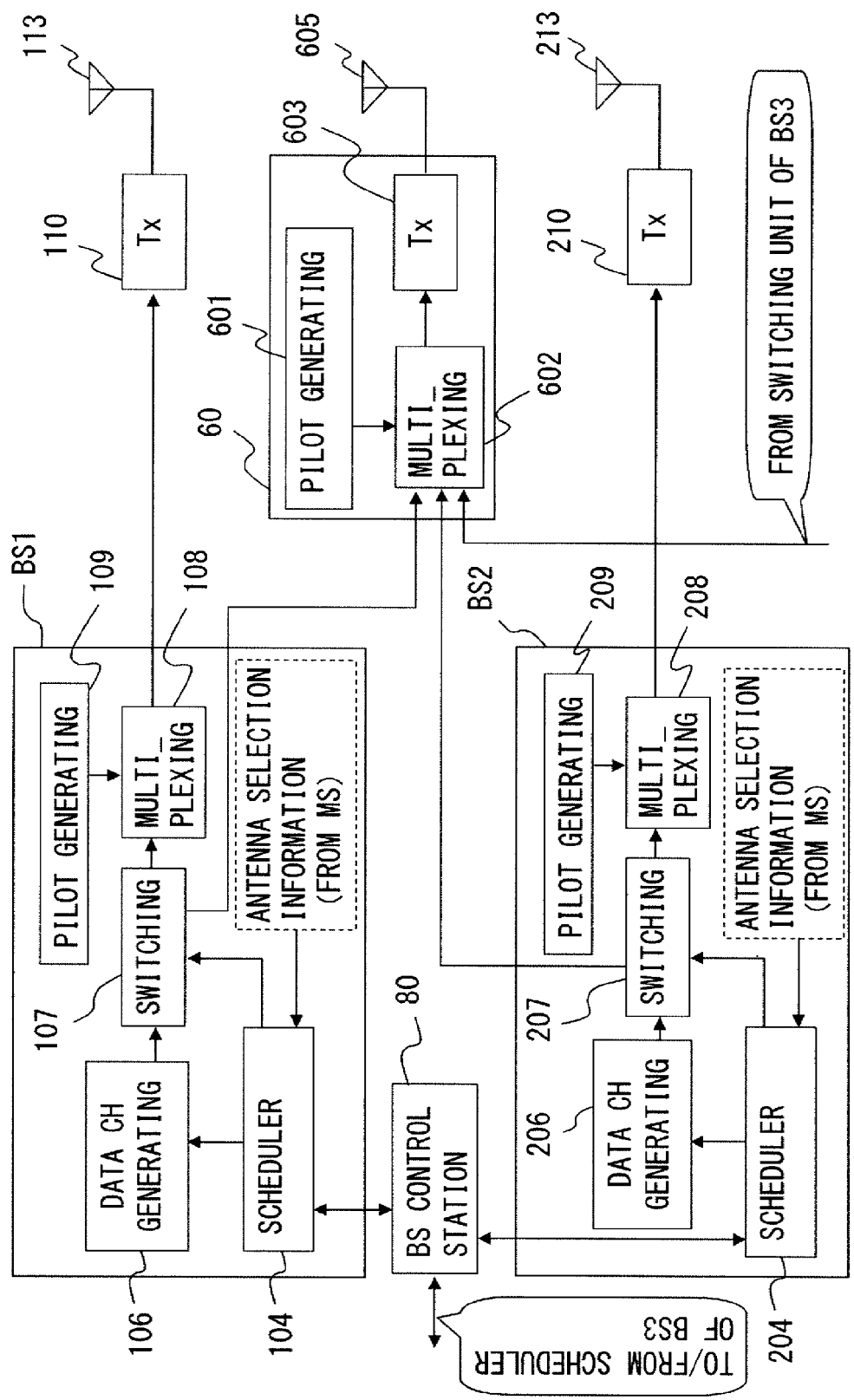
FIG. 6 is a block diagram representing a functional configuration of a cell boundary dedicated antenna apparatus.

FIG. 6 is a block diagram representing a functional configuration of the cell boundary dedicated antenna apparatus.

As illustrated in FIG. 6, the boundary antenna 60 includes a pilot generating unit 601, a multiplexing unit 602, a transmitter 603, a boundary dedicated transmitting antenna 605, etc.

The pilot generating unit 601 generates the pilot signal in the pattern for the boundary antenna 60. The generated pilot signal is transmitted to the multiplexing unit 602.

The multiplexing unit 602 multiplexes the data signals transmitted from the switching units (the switching units 107 and 207, etc.) of the base stations BS1, BS2 and BS3 connected by the high-speed communication interfaces such as the optical fibers with the pilot signal transmitted from the pilot generating unit 601, thereby generating the multiplexed digital baseband signal. In the embodiment, the multiplexed signal generated by the boundary antenna 60 does not contain the control signal. Note that the multiplexed signal may contain the control signal.

In the transmitter 603, the D/A converter (unillustrated) analog-converts the multiplexed digital baseband signal, and the converted baseband signal is frequency-converted, thereby generating the radio signal. The generated radio signal is transmitted from the transmitting antenna 605 dedicated to the boundary.

<Control Station Apparatus>

The control station apparatus has hitherto acquired the scheduling information from each of the base stations and executes the fast cell selection control among the respective base stations. To be specific, the conventional control station gives an instruction of allocating the transmission and stopping the transmission of the transmission data for the mobile station in the fast cell selection mode to each base station in order to actualize the fast cell selection as in FIG. 11. The fast cell selection needs actualizing at the high speed on a transmission-slot basis, and consequently such a problem arises that the apparatus configurations of the base station and the control station get complicated.

It may suffice that the control station apparatus 80 in the embodiment receive, from each base station, only the information on the mobile station taking the fast cell selection mode, which is connected to each base station. Specifically, the control station 80 receives the information specifying the mobile station in the fast cell selection mode that is connected to each base station and the transmission allocation priority level of the mobile station. Based on these items of information, the control station 80 determines the base station employing the boundary antenna 60 for the transmission, and notifies the whole base stations connected to the boundary antenna of a determination result.

The control station 80, if there exists a plurality of mobile stations taking the fast cell selection mode, may average the transmission allocation priority levels of the respective mobile stations for every mobile station, and may allocate the boundary antenna 60 to the base station representing the highest average value. Further, the control station 80 totalizes the transmission allocation priority levels of the respective mobile stations on the mobile-station-by-mobile-station basis, and may allocate the boundary antenna 60 to the base station representing the highest total value. The present invention does not limit the boundary antenna allocation determining method by the control station 80, and it is sufficient that the boundary antenna is allocated to any one of the base stations.

It should be noted that the present invention does not limit the functions other than the above-mentioned function provided in the control station 80, and it may be enough for the control station 80 to include the same handover function as the conventional function. Further, the mobile communication system in the embodiment provides the control station 80 for managing the boundary antenna 60, however, an available scheme is that the control station 80 is not utilized in a way that instead includes the function of the control station 80 in each base station or provides another apparatus including the function of the control station 80.

<Mobile Terminal Device>

Figure 7:
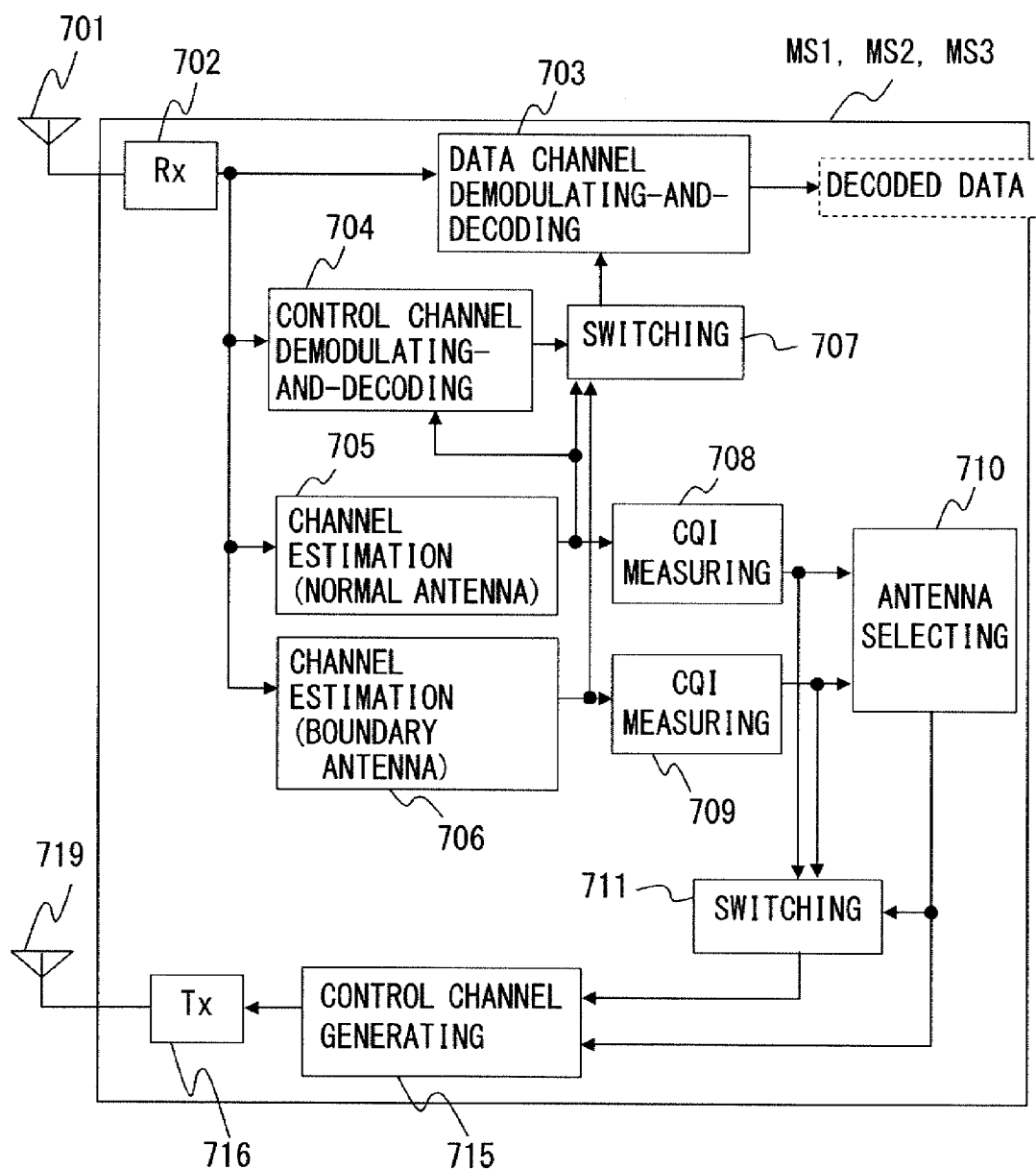
FIG. 7 is a block diagram representing a functional configuration of the mobile terminal device in the embodiment.

FIG. 7 is a block diagram representing a functional configuration of the mobile terminal device in the embodiment. The present invention relates to the transmission function to the mobile station from the base station, and hence FIG. 7 illustrates only the functions related to the present invention. The present invention does not limit the functions other than the function units represented in FIG. 7 and may therefore further include other function units. The respective function units illustrated in FIG. 7 may be realized by the hardware circuits and may also be realized in such a way that the control program stored in the memory is loaded and executed by the CPU.

As represented in FIG. 7, each of the mobile terminal devices MS1, MS2 and MS3 in the embodiment includes a receiving antenna 701, a receiver 702, a data channel demodulating-and-decoding unit 703, a control channel demodulating-and-decoding unit 704, a normal antenna channel estimation unit 705, a boundary antenna channel estimation unit 706, switching units 707 and 711, CQI measuring units 708 and 709, an antennal selecting unit 710, a control channel generating unit 715, a transmitter 716, a transmitting antenna 719, etc. The respective function units will be explained as below.

The receiver 702 frequency-converts the radio signal from the base station, which are received by the receiving antenna 701, into the baseband signal, and the baseband signal is converted by an A/D converter (unillustrated) into the digital baseband signal. The receiver 702 branches and thus transmits the digital baseband signal to the data channel demodulating-and-decoding unit 703, the control channel demodulating-and-decoding unit 704, the normal antenna channel estimation unit 705 and the boundary antenna channel estimation unit 706, respectively.

The normal antenna channel estimation unit 705 performs channel estimation by use of the pilot signals transmitted from the transmitting antennas 113, 213 of the base stations. The channel estimation unit 705 sends the channel estimation value to the control channel demodulating-and-decoding unit 704, the switching unit 707 and the CQI measuring unit 708.

The boundary antenna channel estimation unit 706 conducts the channel estimation by employing the pilot signal transmitted from the boundary antenna 60. The channel estimation unit 706 sends the channel estimation value to the switching unit 707 and the CQI measuring unit 709. The signals transmitted from the boundary antenna 60 contain none of the control signal, and hence there is no necessity for sending the channel estimation value to the control channel demodulating-and-decoding unit 704.

The control channel demodulating-and-decoding unit 704 extracts the control information by demodulating and decoding the digital baseband signals transmitted from the receiver 702. The control information contains the selected user (user ID), the transmission method (the modulation method, the spreading code, etc), the antenna selection information, etc. The extracted information such as the antenna selection information and the transmission method is transmitted to the switching unit 707.

The switching unit 707 switches over the channel estimation value used for demodulating the data channel with the antenna selection information sent from the control channel demodulating-and-decoding unit 704. To be specific, the switching unit 707 sends the channel estimation value transmitted from the channel estimation unit 705 to the data channel demodulating-and-decoding unit 703 if the antenna selection information indicates the normal antenna, and sends the channel estimation value transmitted from the channel estimation unit 706 to the data channel demodulating-and-decoding unit 703 if the antenna selection information indicates the boundary antenna 60.

The data channel demodulating-and-decoding unit 703 demodulates and decodes, based on the channel estimation value sent from the switching unit 707, the digital baseband signal transmitted from the receiver 702. The data obtained by decoding is sent to other data processing units (unillustrated).

The CQI measuring units 708 and 709 measure the CQIs from the channel estimation values sent from the respective channel estimation units 705 and 706. The measured CQIs are transmitted to the antennal selecting unit 710 and the switching unit 711.

The antennal selecting unit 710, if a difference between the CQIs sent from the CQI measuring units 708 and 709 is equal to or smaller than a predetermined threshold value, determines to make a transition to the fast cell selection mode. Upon the determination of the transition to the fast cell selection mode, the antennal selecting unit 710 selects the antenna offering the better reception quality by comparing the respective CQIs with each other. Namely, the antennal selecting unit 710 selects the antenna, the normal base station antenna or the boundary antenna 60, which offers the better reception quality, and generates the antenna selection information from which the selected antenna can be specified. The antenna selection information is transmitted to the switching unit 711 and the control channel generating unit 715. Note that the antennal selecting unit 710, when determining that the CQI difference is larger than the predetermined threshold value, selects the antenna of the connected base station as the normal communication mode.

The switching unit 711 switches, based on the antenna selection information sent from the antenna selecting unit 710, the output so as to transmit the CQI of the selected antenna to the control channel generating unit 715.

The control channel generating unit 715 generates the control signal containing the antenna selection information sent from the antennal selecting unit 710 and the CQI information sent from the switching unit 711. This control signal is transmitted to the base station via an uplink control channel.

In the transmitter 716, the D/A converter (unillustrated) analog-converts the digital baseband signal serving as the control signal, and the thus-converted baseband signal is frequency-converted, thereby generating the radio signal. The generated radio signal is transmitted from the transmitting antenna 719.

Operational Example

Figure 8:
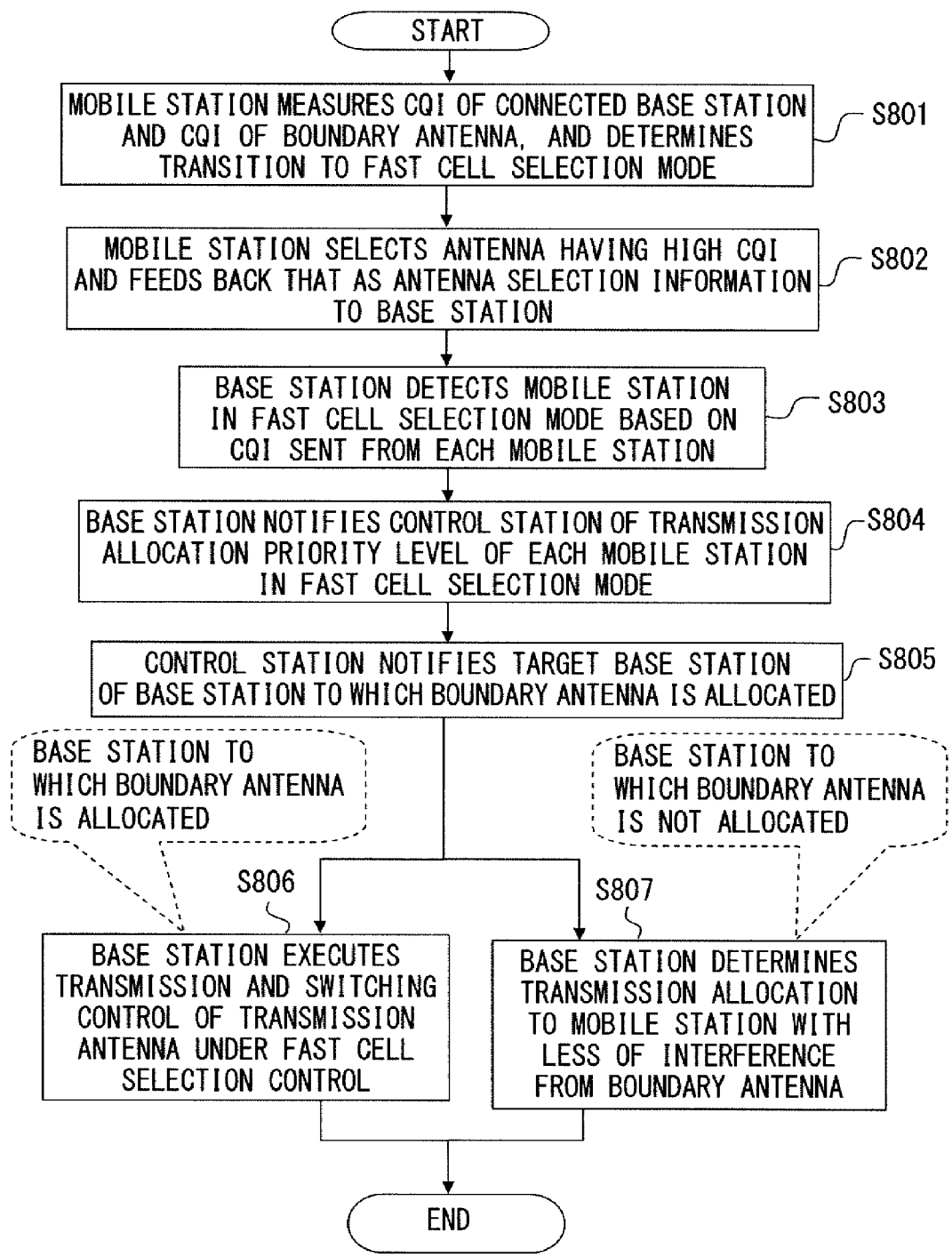
FIG. 8 is a flowchart representing an operational example of the mobile communication system in the embodiment.

An operational example of the mobile communication system in the embodiment will hereinafter be described with reference to FIG. 8. FIG. 8 is a flowchart representing the operational example of the mobile communication system in the embodiment.

The mobile station successively detects the information (the unique pattern etc) about the respective pilot signals transmitted from the peripheral base stations and from the boundary antenna 60 on the basis of broadcasting information given from the individual base stations. The mobile station receives the pilot signal transmitted from the antenna of the in-connection base station and the pilot signal transmitted from the boundary antenna 60 through these pieces of information. The mobile station performs the channel estimation of each of the pilot signals and generates the CQIs corresponding to the respective channel estimation values. The mobile station, when deciding that the CQI difference is within the predetermined threshold value, determines the transition to the fast cell selection mode (S801).

The mobile station, when determining the transition to the fast cell selection mode, selects the antenna, the base station antenna or the boundary antenna, which exhibits the better reception quality. The mobile station notifies the base station of the antenna selection information specifying the selected antenna and the CQI of the antenna via the control channel (S802).

Note that the embodiment has the scheme of detecting that the mobile station, if the control information transmitted from the mobile station contains the antenna selection information, shifts to the fast cell selection mode, however, the mobile station may also notify of a fast cell selection request. Further, the mobile station, which does not transition to the fast cell selection mode, notifies as usual the base station of the CQI about the antenna of the connected base station.

The base station, when receiving the antenna selection information transmitted from each mobile station, detects that the mobile station is in the fast cell selection mode (S803).

The base station generates, based on the scheduling information, the transmission allocation priority level of the mobile station in the fast cell selection mode. The base station transmits, to the control station 80, the information specifying the mobile station in the fast cell selection mode in each of the connected mobile stations and the transmission allocation priority level of the specified mobile station (S804).

The control station 80 determines the base station which allocates the boundary antenna 60 on the basis of the transmission allocation priority level of the mobile station, which is transmitted from each base station. The control station 80 notifies all of the base stations sharing the boundary antenna 60, of the base station to which the boundary antenna 60 is allocated (S805).

The base station receiving the use permitting notification of the boundary antenna 60 in all of the base stations sharing the boundary antenna 60, executes the fast cell selection control for the mobile station in the fast cell selection mode till receiving the notification purporting that the boundary antenna 60 is allocated to another base station (S806). Namely, the base station switches the transmitting antenna at the high speed so that the transmission data for the mobile station in the fast cell selection mode is transmitted from the antenna (any one of the base station antenna and the boundary antenna) offering the high reception quality on the basis of the antenna selection information of which the mobile station notifies.

On the other hand, the base station, which does not receive the use permitting notification of the boundary antenna 60, selects the mobile station with less of the interference from the boundary antenna 60 and allocates the transmission while the boundary antenna 60 is used by another base station (S807).

The flowchart in FIG. 8 represents the example in which the base station receiving the use permitting notification of the boundary antenna shifts to the fast cell selection using the boundary antenna, however, the use permitting notification and the fast cell selection may be executed simultaneously, i.e., may be executed in a way that synchronizes an update period of the use permitting notification with a period of the fast cell selection.

In the mobile communication system according to the embodiment, the reception quality information (CQI etc) of the signal from each antenna is generated based on the pilot signal transmitted from the antenna (the normal antenna) of the in-connection base station and the pilot signal transmitted from the boundary antenna 60 in the mobile station. When deciding that the difference between these CQIs is within the predetermined threshold value, the transition to the fast cell selection mode is determined.

When the transmission to the fast cell selection mode is determined in the mobile station, the fast cell selection is requested of the connected base station. This request notification includes the antenna selection information containing the information on the antenna, the base station antenna or the boundary antenna, which exhibits the better reception quality, and includes the CQI of the antenna.

In the base station, when detecting the connected mobile station is in the fast cell selection mode, the transmission allocation priority level of this mobile station is generated based on the scheduling information. The information specifying the mobile station in the fast cell selection mode and the transmission allocation priority level are transmitted to the control station 80.

In the control station 80, the base station to which the boundary antenna 60 should be allocated is determined. All of the base stations sharing the boundary antenna 60 with each other are notified of the content of this determination.

In the base station receiving the use permitting notification of the boundary antenna 60, the fast cell selection control between the boundary antenna 60 and the normal antenna is executed for the mobile station in the fast cell selection mode. Under the fast cell selection control, the transmitting antenna is switched over at the high speed so that the transmission data for the target mobile station is transmitted from any one of the normal antenna and the boundary antenna on the basis of the antenna selection information of which the target mobile station notifies.

Thus, in the mobile communication system according to the embodiment, the fast cell selection is carried out between the normal antenna of each base station and the boundary antenna 60 by using the boundary antenna 60 installed in the vicinity of the border among the three cells. When one single base station executes the fast cell selection by employing the boundary antenna 60, other base stations perform the transmission allocation for the mobile stations which do not exist in the vicinity of the cell boundary.

This configuration enables all of the wireless resources of the cells formed by the respective base stations to be utilized and the highly-acceptable communications with the mobile stations existing in the vicinity of the cell boundary to be performed. By extension, the cell average throughput can be improved.

Moreover, on the occasion of actualizing the fast cell selection, the information transmitted and received among the base stations is only the information specifying the mobile station in the fast cell selection mode and the transmission allocation priority level of this mobile station. Further, the actualization of the fast cell selection involves using only the switching unit 107 as the function unit that is newly required of each base station.

Hence, there is no necessity for changing the apparatus configuration and the hardware interface to a great degree, and, with the simple apparatus configuration, it is feasible to actualize the fast cell selection and to improve the cell average throughput.

Modified Example

Figure 9:
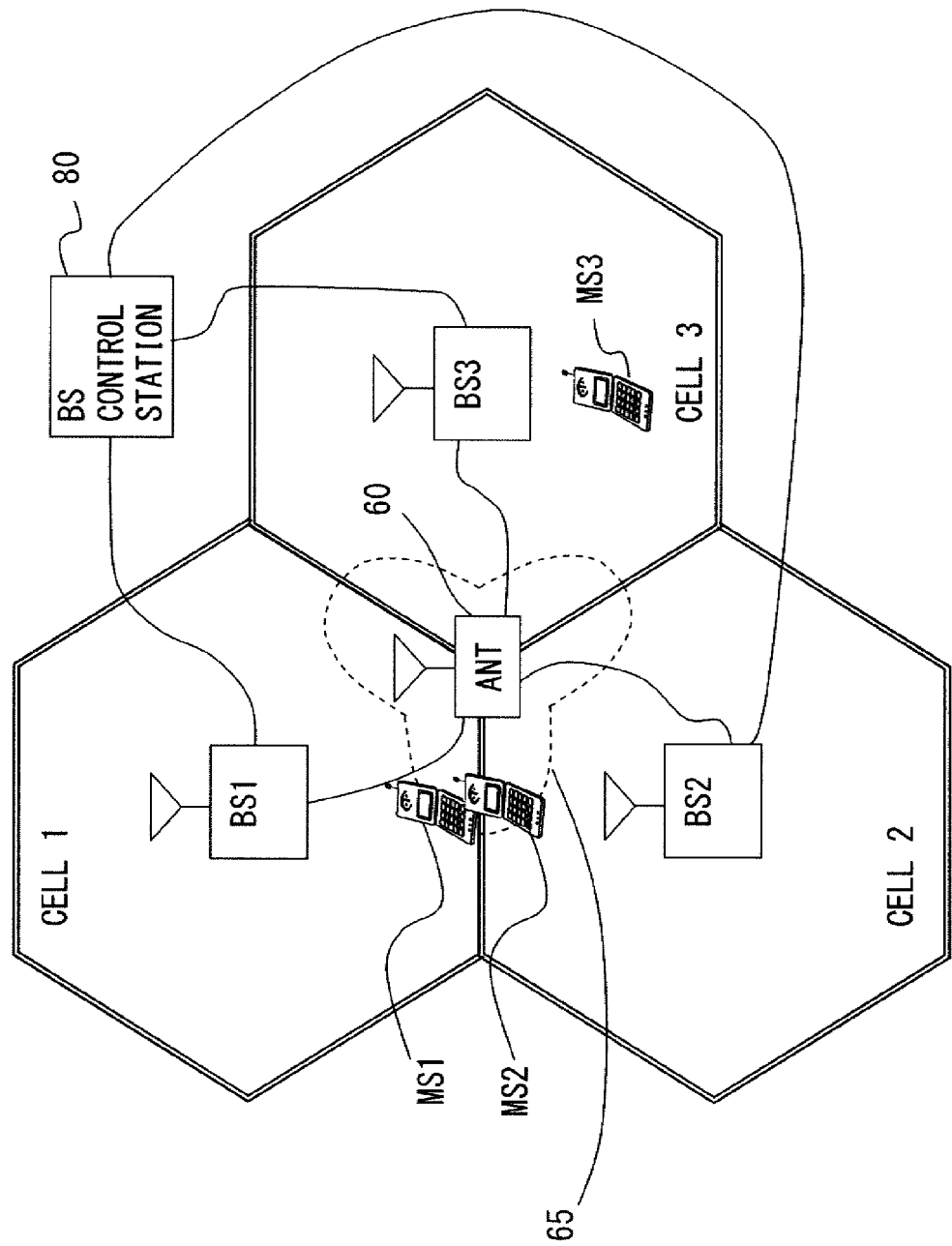
FIG. 9 is a diagram representing an example of how the mobile station devices are disposed.

In the mobile communication system according to the embodiment discussed above, only any one of the plurality of base stations sharing the boundary antenna executes the fast cell selection by using the boundary antenna. For example, as illustrated in FIG. 9, when the mobile station MS1 connecting with the base station BS1 and the mobile station MS2 connecting with the base station BS2 exist in the vicinity of the border between the cell 1 and the cell 2, any one of the base stations BS1 and BS2 utilizes the boundary antenna and executes the fast cell selection on the basis of the transmission allocation priority level of each mobile station. Then, the base station obtaining none of the permission for using the boundary antenna preferentially allocates the transmission to another mobile station that is not the mobile station taking the fast cell selection mode.

A modified example is a scheme of permitting the two or more base stations to use the boundary antenna simultaneously. To be specific, a scheme in the example of FIG. 9 makes it possible to simultaneously execute the fast cell selection between the boundary antenna 60 and the base station BS1 for the mobile station MS1 and the fast cell selection between the boundary antenna 60 and the base station BS2 for the mobile station MS2. This scheme is realized by providing a mechanism for orthogonalizing respective pieces of transmission data to be transmitted from the boundary antenna with each other. In order to orthogonalize the transmission data, spreading which uses orthogonal codes may be used and multiplexing may be used in a way that shifts a transmission frequency (subcarrier) and transmission time (symbol).

Figure 10:
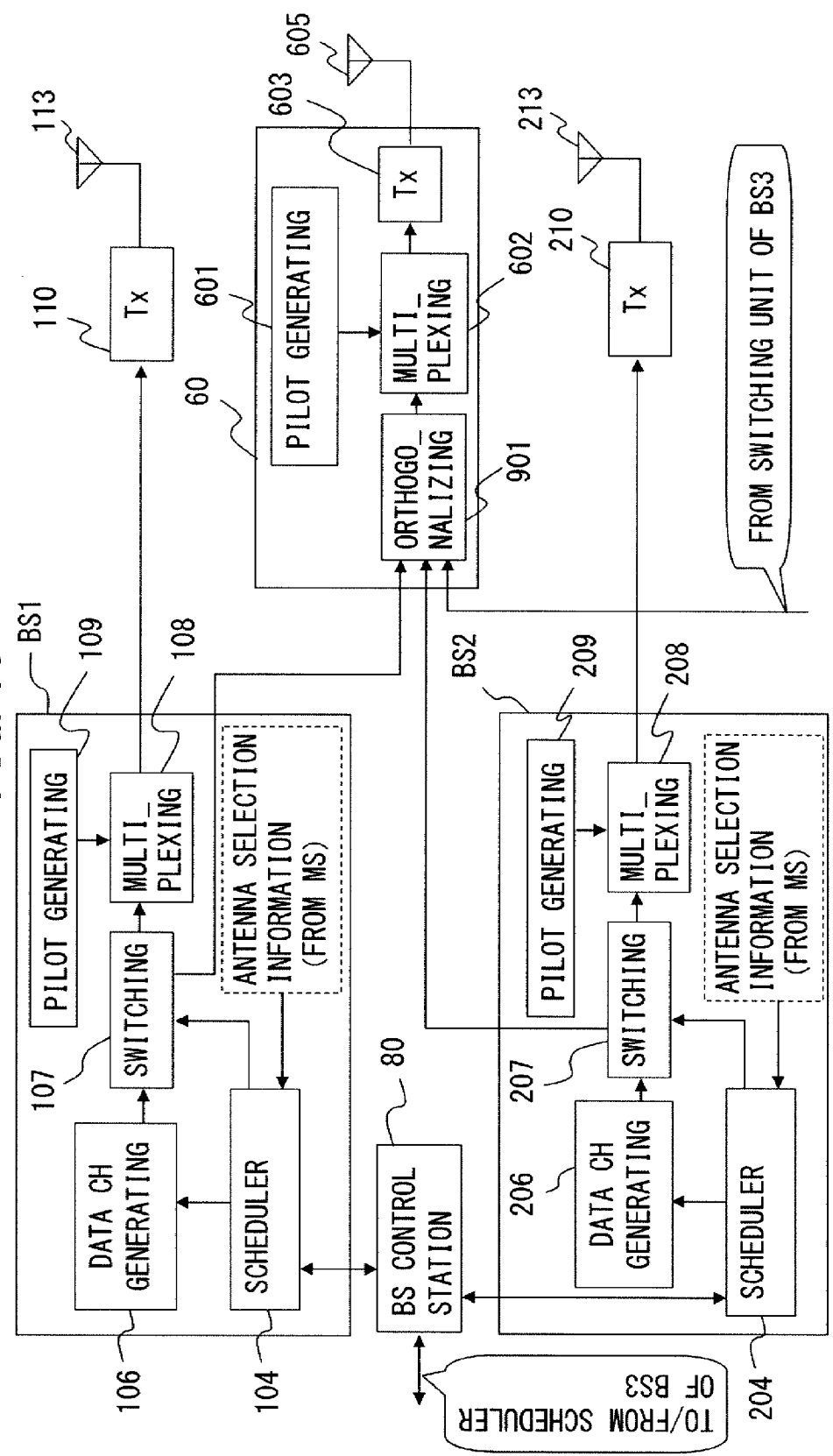
FIG. 10 is a block diagram representing a functional configuration of the cell boundary dedicated antenna apparatus by way of a modified example.

FIG. 10 is a block diagram representing a functional configuration of the cell boundary dedicated antenna apparatus by way of a modified example. As illustrated in FIG. 10, the boundary antenna 60 in the modified example further includes an orthogonalizing unit 901 in addition to the function units in the embodiment discussed above.

In this case, the control station 80, when obtaining the information on the mobile stations (e.g., MS1 and MS2) in the fast cell selection mode from the plurality of base stations (e.g., BS1 and BS2), sends back collision information representing that there exists a plurality of requests for using the boundary antenna to the respective base stations.

The schedulers 104 and 204 of the base stations BS1 and BS2, upon receiving the collision information, instruct the control channel generating units 105 to contain the collision information in the control information for the mobile stations MS1 and MS2. With this contrivance, the mobile station MS1 in the fast cell selection mode that is connected to the base station BS1 and the mobile station MS2 in the fast cell selection mode that is connected to the base station BS2, respectively acquire the collision information.

Further, each of the schedulers 104 and 204 instructs, when the transmission data for the mobile station in the fast cell selection mode is transmitted from the boundary antenna 60, the switching unit 107 to switch over the antenna and to send the collision information to the boundary antenna 60. Note that the schedulers 104 and 204 may notify the boundary antenna 60 of the collision information. At this time, the schedulers 104 and 204 may perform setting so that a transmission rate does not decrease owing to the orthogonal multiplexing by changing the data modulation method to, e.g., 16 QAM from QPSK.

The orthogonalizing unit 901 of the boundary antenna 60, upon receiving the collision information and the respective pieces of transmission data from the switching units 107 and 207, execute a process of orthogonalizing the respective pieces of transmission data to each other. For example, the orthogonalizing unit 901 retains, in the memory etc, a spreading code A predetermined for the base station BS1 and a spreading code B predetermined for the base station BS2, which are orthogonal to each other, then spreads the transmission data for the mobile station MS1 with the spreading code A and spreads the transmission data for the mobile station MS2 with the spreading code B. Thus, the respective pieces of transmission data, which are spread by the orthogonalizing unit 901, are multiplexed with the pilot signals by the multiplexing unit 602 and thus transmitted.

On the other hand, the mobile stations MS1 and MS2 previously retain both of the spreading codes A and B and, when obtaining the collision information via the control channel, hereafter de-spread the received data with the spreading code corresponding to the connected base station.

Incidentally, in the case of adopting a technique, as a transmission data orthogonalizing technique, of shifting the transmission frequency and the transmission time (timeslot) so as not to overlap with each other, the orthogonalizing unit 901 may execute the predetermined shift for each base station.

Normally, the respective signals transmitted from the different base station antennas undergo a deviation in reception timing and are affected by frequency selective fading due to a delay of propagation, and therefore interfere with each other with the orthogonality being broken down, resulting in a decline of the reception characteristic.

According to the present modified example, however, when the plural pieces of transmission data are transmitted simultaneously from the boundary antenna 60, the received timing is synchronized, whereby the preferable orthogonality is kept.

What is claimed is:

1. A base station apparatus comprising:
   a first basic antenna which forms a first cell;
   a second basic antenna which forms a second cell neighboring to the first cell;
   a boundary antenna which has a propagation area directivity limited to a vicinity of a cell boundary between the first cell and the second cell; and
   a switching circuit configured to switch an antenna, for transmitting a radio signal to a terminal device existing within the first cell and existing in the propagation area of the boundary antenna, on a transmission-slot basis in a fast cell selection, between the first basic antenna and the boundary antenna instead of switching an antenna between the first basic antenna and the second basic antenna,
   wherein the boundary antenna further includes an orthogonalizing circuit configured to orthogonalize transmission data for a terminal device existing in the first cell and transmission data for a terminal device existing in the second cell to each other when at least one terminal device exists in each of the first cell as well as within the propagation area of the boundary antenna and the second cell as well as within the propagation area of the boundary antenna.

2. The base station apparatus according to claim 1, further comprising:
   a control circuit configured to control the switching circuit so as to transmit the radio signal to the terminal device via the first basic antenna or the boundary antenna, which offers a better propagation state for the terminal device.

3. The base station apparatus according to claim 2, further comprising:
   a determining circuit configured to determine identifying information for specifying a terminal device existing in the propagation area of the boundary antenna and a transmission allocation priority level for the terminal device based on control information transmitted from the terminal device,
   wherein the control circuit instructs, when obtaining a permission for using the boundary antenna that is determined based on the identifying information and the transmission allocation priority level, the switching circuit to execute the switching control by use of the boundary antenna.

4. The base station apparatus according to claim 1, further comprising:
   a scheduler configured to make, when the boundary antenna is utilized for the switching control, allocation so that a radio signal is transmitted from the second basic antenna forming the second cell to another terminal device within the second cell by use of the same frequency as a frequency of the radio signal for the terminal device existing within the first cell and existing in the propagation area of the boundary antenna.

5. The base station apparatus according to claim 1, further comprising:
   a scheduler configured to make allocation so that the switching control using the boundary antenna is switched between a terminal device existing in the first cell and a terminal device existing in the second cell when at least one terminal device exists in each of the first cell and the second cell as well as existing within the propagation area of the boundary antenna.

6. The base station apparatus according to claim 1, further comprising:
   a multiplexing circuit configured to multiplex a pilot signal distinguishable from a pilot signal to be transmitted from the boundary antenna with a signal to be transmitted from the first basic antenna.

7. A mobile communication system comprising:
   a plurality of base station apparatuses each including a basic antenna which forms a cell; and
   a boundary antenna apparatus including a boundary antenna a propagation area directivity limited to a vicinity of a neighboring-cell boundary between different base station apparatuses,
   wherein each of the plurality of the base station apparatuses includes a switching circuit configured to switch an antenna, for transmitting a radio signal to a terminal device existing within the cell of the base station apparatus itself and existing in the propagation area of the boundary antenna, on a transmission-slot basis in a fast cell selection, between the basic antenna and the boundary antenna instead of switching an antenna between basic antennas of the different base station apparatuses, and
   the boundary antenna apparatus includes an orthogonalizing circuit configured to orthogonalize transmission data for terminal devices existing in each of the cells to each other when at least one terminal device exists in each of the cells between which a cell boundary is formed within the propagation area of the boundary antenna.

8. The mobile communication system according to claim 7, wherein each of the plurality of base station apparatuses further includes a control circuit configured to control the switching circuit so as to transmit the radio signal to the terminal device via the basic antenna or the boundary antenna, which offers a better propagation state for the terminal device.

9. The mobile communication system according to claim 8,
wherein each of the plurality of base station apparatuses further includes a determining circuit configured to determine identifying information for specifying a terminal device existing in the propagation area of the boundary antenna and a transmission allocation priority level for the terminal device, based on control information transmitted from the terminal device, wherein the control circuit instructs, when obtaining a permission for using the boundary antenna, the switching circuit to execute the switching control by use of the boundary antenna.

10. The mobile communication system according to claim 9, further comprising a control station apparatus including:
a collecting circuit configured to collect the identifying information and the transmission allocation priority level from the base station apparatus which is scheduled an antenna use and forms each of cells included in the propagation area of the boundary antenna;
an antenna allocating circuit configured to determine a base station apparatus enabled to utilize the boundary antenna for the switching control based on the identifying information and the transmission allocation priority level, which are collected by the collecting circuit; and
a transmitting circuit configured to transmit information on the base station apparatus determined by the antenna allocating circuit to the base station scheduled the antenna use.

11. The mobile communication system according to claim 7, wherein each of the plurality of base station apparatuses further includes a scheduler configured to make, when another base station executes the switching control by use of the boundary antenna, allocation so that a radio signal is transmitted to a terminal device within the cell of the base station apparatus itself by use of the same frequency as a frequency of the radio signal for a terminal device existing within the cell of said another base station and existing in the propagation area of the boundary antenna.

12. The mobile communication system according to claim 7, wherein each of the plurality of base station apparatuses further includes a scheduler configured to make allocation so that the switching control using the boundary antenna is switched between a terminal device existing in a first cell and a terminal device existing in a second cell when at least one terminal device exists in each of the first cell and the second cell between which a cell boundary is formed within the propagation area of the boundary antenna.

13. The mobile communication system according to claim 7, wherein the boundary antenna apparatus further includes a multiplexing circuit configured to multiplex a pilot signal distinguishable from a pilot signal to be transmitted from the basic antenna of each of the plurality of base station apparatuses with a signal to be transmitted from the boundary antenna.

14. A cell selection communication method executed by a base station apparatus including a first basic antenna forming a first cell and a second basic antenna forming a second cell neighboring to the first cell, comprising:
switching an antenna, for transmitting a radio signal to a terminal device existing within the first cell and existing in a propagation area of a boundary antenna, on a transmission-slot basis in a fast cell selection, between the basic antenna and the boundary antenna which has the propagation area directivity limited to a vicinity of a cell boundary between the first cell and the second cell, instead of switching an antenna between the first basic antenna and the second basic antenna, and
orthogonalizing transmission data for a terminal device existing in the first cell and the transmission data for a terminal device existing in the second cell to each other in the boundary antenna when at least one terminal device exists in each of the first cell as well as within the propagation area of the boundary antenna and the second cell as well as within the propagation area of the boundary antenna.

15. The cell selection communication method according to claim 14, further comprising:
controlling the antenna switching so as to transmit a radio signal to the terminal device via the first basic antenna or the boundary antenna, which offers a better propagation state for the terminal device.

16. The cell selection communication method according to claim 14, further comprising:
making, when the boundary antenna is utilized for the switching control, allocation so that a radio signal is transmitted from the second basic antenna forming the second cell to another terminal device within the second cell by use of the same frequency as a frequency of the radio signal for the terminal device existing within the first cell and existing in the propagation area of the boundary antenna.

17. The cell selection communication method according to claim 14, further comprising:
making allocation so that the switching control using the boundary antenna is switched between a terminal device existing in the first cell and a terminal device existing in the second cell when at least one terminal device exists in each of the first cell and the second cell as well as existing within the propagation area of the boundary antenna.

* * * * *